United States Patent
Siebenlist

[11] Patent Number: 5,361,498
[45] Date of Patent: Nov. 8, 1994

[54] CUTTING NIPPERS

[75] Inventor: Bernd Siebenlist, Tönisvorst, Germany

[73] Assignee: Josef Bohle Stiftung + Co. KG, Germany

[21] Appl. No.: 923,984

[22] PCT Filed: May 17, 1991

[86] PCT No.: PCT/DE91/00399

§ 371 Date: Sep. 16, 1992

§ 102(e) Date: Sep. 16, 1992

[87] PCT Pub. No.: WO91/17964

PCT Pub. Date: Nov. 28, 1991

[30] Foreign Application Priority Data

May 21, 1990 [DE] Germany .................. 4016310

[51] Int. Cl.$^5$ .................................... B25B 7/02
[52] U.S. Cl. .................................. 30/164.95
[58] Field of Search ........... 30/164.95, 278, 41.5, 30/41.9, 43, 131, 132; 65/112; 47/1.5

[56] References Cited

U.S. PATENT DOCUMENTS

| | | | |
|---|---|---|---|
| 496,407 | 5/1893 | Goldman | 30/131 |
| 862,049 | 7/1907 | Booth | 30/164.95 |
| 934,487 | 9/1909 | Ward et al. | 30/164.95 |
| 936,674 | 10/1909 | Skimmer | 30/164.95 |
| 1,201,515 | 10/1916 | Sidon | 30/164.95 |
| 1,482,206 | 1/1984 | Tuley | 30/164.95 |
| 2,268,257 | 12/1941 | Kobylinski | 30/164.95 |
| 5,014,436 | 5/1991 | Kozyrski et al. | 30/164.95 |

*Primary Examiner*—Richard K. Seidel
*Assistant Examiner*—Paul M. Heyrana
*Attorney, Agent, or Firm*—Diller, Ramik & Wight

[57] ABSTRACT

Cutting nippers (1), which are used for cutting tiles and glass, are provided with two long operating handles (5), two short pressure levers (6) and nipping tools located on the working ends of the pressure levers (6). To allow a simple and optimum design of the nipping tools, the nipping tools consist of cutting wheels (7, 8), preferably made of sintered metal carbide, which can be secured to the working ends of the pressure levers (6). The cutting wheels (7, 8) are secured with the aid of screws (11) and can be set to any desired rotational positions relative to the working ends of the pressure levers (6).

17 Claims, 4 Drawing Sheets

FIG. 1
FIG. 2
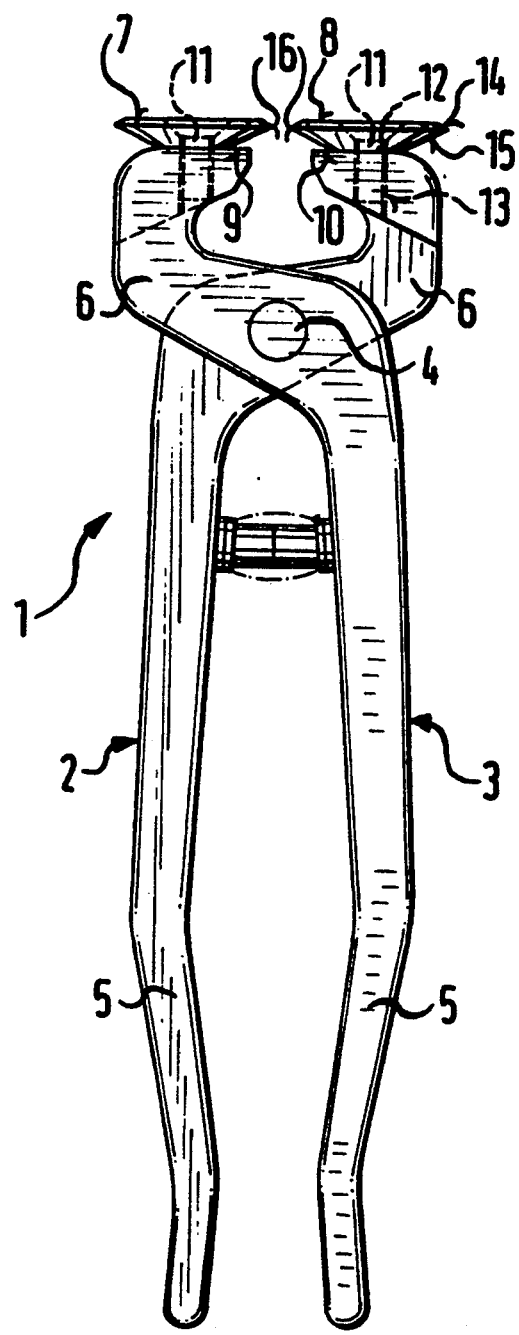
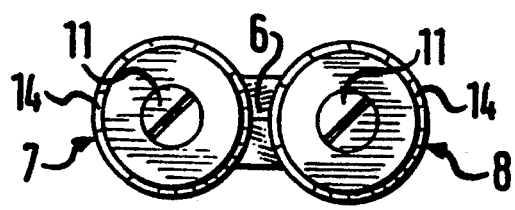

CUTTING NIPPERS

BACKGROUND OF THE INVENTION

The invention relates to cutting nippers, particularly for cutting glass panes, tiles, and the like, with two long operating handles, two shorter pressure levers and detachable nipping tools located on the working ends of the pressure levers, said tools being provided with cutting edges which are directed towards each other and can be moved towards and away from each other.

In a known design of tile cutting nippers of the aforementioned type (DE-A 32 12 624), the pressure levers have integrally moulded angles which run vertical to the levers and are directed towards each other, said angles being formed into the cutting edges in one piece, i.e. in undetachable form. In this known design, the cutting tools consists of the same material as the levers and have, to be adapted to their intended use by means of complex heat-treatment processes and grinding work. In this context, the entire lever mechanism has to run through the full manufacturing process of the cutting tools.

SUMMARY OF THE INVENTION

In a known design of nipper pliers for twisting and cutting-off wire ends (DE-B 28 32 425), the cutting tools are designed as separate tips which can be secured to the pressure levers of the pliers with the aid of screws.

Working on the known prior art, the invention is based on the task of creating cutting nippers whose nipping tools can be kept sharp at all times with relatively little effort.

According to the invention, this task is solved by designing the nipping tools to consist of cutting wheels and by the fact that the cutting wheels can be secured in various or any desired rotational positions relative to the working ends of the pressure levers.

In the design according to the invention, the cutting wheels forming the nipping tools can be manufactured and machined independently of the lever mechanism. The nipping tools are not fitted to the pressure levers until the cutting wheels are completely finished. This can considerably facilitate the manufacturing process.

Furthermore, the design in accordance with the invention has the advantage not only that worn cutting wheels can be replaced by new, sharp cutting wheels, but also that the full circumference of the cutting wheels can be utilised. Therefore, before a cutting wheel is regarded as blunt and in need of replacement, it can first be set to between 12 and 24 different positions, depending on application, with a sharp cutting area being available each time.

The use of cutting wheels as nipping tools also achieves a surprising new technical effect. To perform a nipping operation, the user now has to apply substantially less force, the result being that the new device is particularly gentle on the arms. The easier and more pleasant work width the curved cutting edges also permits far more accurate and targeted work. Furthermore, the new tool can even be used easily and comfortably by inexperienced persons. For the Tiffany technique, in particular, the invention creates a new tool which exceeds all expectations.

The cutting wheels can preferably be securable not only in predetermined rotational positions, but in any desired rotational positions relative to the working ends of the pressure levers, so that, when the working area has become blunt, the cutting wheels can be rotated through any desired angle and then secured again. This makes it possible to use the full circumference of the cutting wheels, depending on application, and thus multiply the service life of the cutting nippers.

To aid setting, angle settings can be provided on the cutting wheels, thus making it easier for the user to advance the cutting wheels through a specified angle.

For securing the cutting wheels, these can have a central drilled hole and be screwed tight to the working ends of the pressure levers with the aid of one screw each. A fastening method of this kind presents absolutely no problems and also facilitates adjustment of the cutting wheels when the working area in use has worn.

It is expedient for each cutting wheel to have bevels sloping away from the circumferential cutting edge in both directions. In this context, each cutting wheel can have the form of a rotating member consisting of two truncated cones, where the two base areas of the truncated cones have the same diameter, are in contact with each other and form the cutting edge.

As an alternative, it is also possible to give each cutting wheel the form of a truncated cone, in which case the circumference of the larger base area forms the cutting edge.

Furthermore, the design in accordance with the invention has the advantage that the cutting wheels can be made from a different material than the lever mechanism. The cutting wheels are preferably made of sintered metal carbide, the properties of which are particularly well adapted to the requirements imposed on the nipping tools. Although sintered metal carbide is very expensive, its price is hardly relevant because only small quantities of material are required for the cutting wheels. In contrast, the lever mechanism can be made of relatively inexpensive material which need only fulfil the mechanical requirements imposed.

In designing the lever mechanism, it is possible to fall back on time-proven, known designs where, for example, a combination of one operating handle and one pressure lever is made from a single piece and forms a two-armed lever, with these two-armed levers being connected in pairs via a common axis of rotation.

With a lever design of this kind, the cutting wheels can be located on the ends of the pressure levers facing away from the axis of rotation, with the axes of the cutting wheels being roughly vertical to the ends of the pressure levers and assuming a position in which they are roughly parallel to each other when the cutting wheels are in the nipping position.

As an alternative, however, the cutting wheels can also be located on the lateral flanks of the pressure levers, close to their ends facing away from the axis of rotation, with the cutting wheels lying roughly in a common plane and having axes which run roughly parallel to each other and parallel to the axis of rotation of the levers.

The cutting nippers according to the invention can have threaded holes, both in the ends of the pressure levers facing away from the axis of rotation and also vertically thereto in the lateral flanks of the pressure levers, to allow the user himself to attach the pair of cutting wheels in question in the two positions described above, as required and desired. An embodiment of the cutting nippers of this kind can, therefore, optionally be set to one design principle or the other.

In an embodiment of the cutting wheels with bevels provided on both sides, the side facing away from the relevant pressure lever should have only a short bevel, in order to facilitate the positioning of the cutting edges on a marked line.

If, in contrast, the cutting wheels have the cross-sectional form of a truncated cone, the larger base area forming the cutting edge should be located on the side facing away from the relevant pressure level, again to provide the user with a clear view.

A collector for splinters and chippings is provided behind the nipping tools, on the side towards which the splinters and chippings fly. This allows clean work with the cutting nippers according to the invention, without splinters and chippings flying into the room and possibly causing injuries.

In an embodiment of the cutting nippers where the cutting wheels are located on the lateral flanks Of the pressure levers, the collector expediently consists of a plastic elbow with a collecting bag made of flexible material secured to the side facing away from the cutting nippers. When the cutting nippers are used in such a way that the cutting wheels cut a sheet of glass from the top and bottom sides, there a horizontal section of the elbow comes first behind the cutting wheels, while the curved section points downwards.

It is expedient for the mounting end of the elbow to be fitted with a collar in which the elbow can be pivoted. In this way, the elbow can be always positioned in such a way that the collecting bag hangs down, regardless of the working position of the nipping tools.

The receiving end of the collector can be fitted with a wire clasp, the mounting ends of which are secured to the working levers of the cutting nippers.

The mounting ends of the wire clasp can be provided with axially projecting pins which can be inserted into corresponding holes drilled in the pressure levers.

The invention is illustrated in the drawings by way of example and described in detail below on the basis of the drawings. The illustrations show the following:

BRIEF DESCRIPTION OF THE DRAWINGS

FIG. 1 Side view of a first embodiment of a pair of cutting nippers.

FIG. 2 View II from FIG. 1.

DESCRIPTION OF THE PREFERRED EMBODIMENTS

Figure 3:
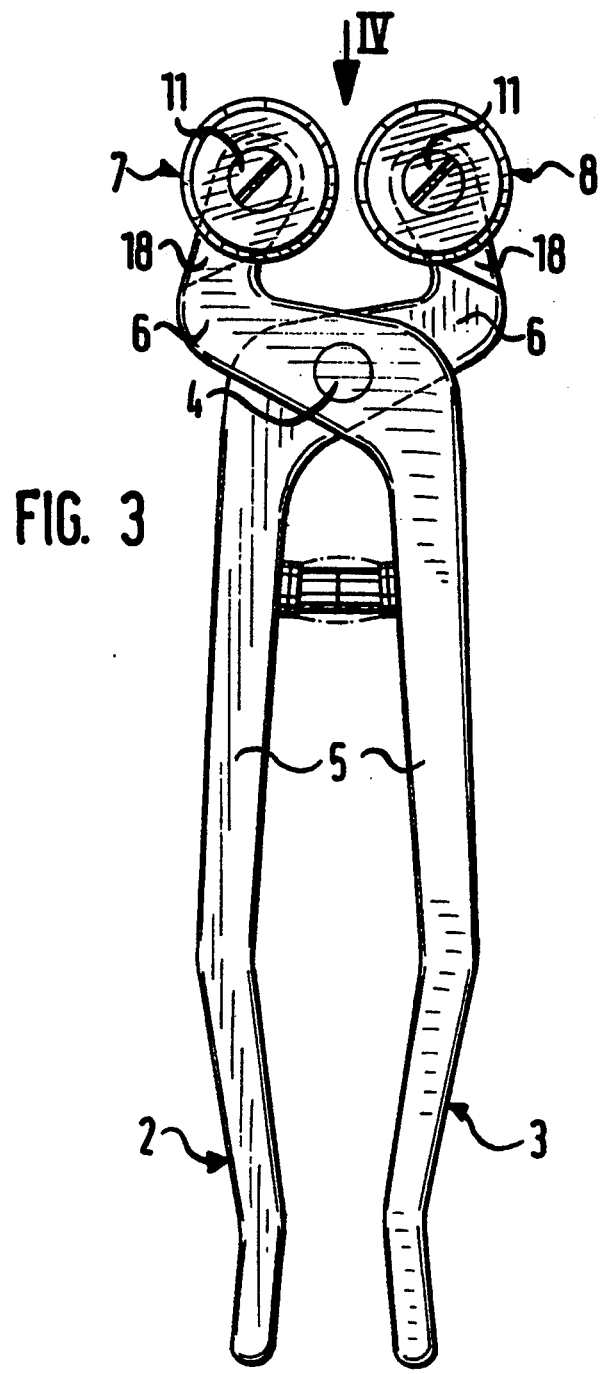
FIG. 3 View of a modification of a pair of cutting nippers.

According to FIGS. 1 and 2 in the drawings, cutting nippers 1 consist of two, two-armed levers 2 and 3, which are connected in a common axis of rotation 4. In this pincer-type design, each two-armed lever 2 or 3 consists of a longer operating handle 5 and a shorter pressure lever 6. The two, two-armed levers cross in the axis of rotation 4, with the result that squeezing the two operating handles 5 also causes squeezing of the two pressure levers 6.

The nipping tools consist of two cutting wheels 7 and 8, located on ends 9 and 10 of pressure levers 6 which face away from the axis of rotation 4. Cutting wheels 7 and 8 are secured in various or any desired rotational position relative to the working ends of the pressure levers 6 by means of screws 11, which pass through concentric holes 12 drilled in cutting wheels 7 and 8. In this manner the screws 6 define means for adjustably securing each cutting wheel 7, 8 in any desired autorotational position relative to the rotational axis or axis of symmetry of each cutting wheel 7, 8. The thread ends of screws 11 are screwed into threaded holes 13incorporated into ends 9 and 10 of pressure levers 6.

Threaded holes 13 run vertical to the ends of pressure levers 6 and assume a position in which they are parallel to each other when cutting wheels 7 and 8 are in the nipping position.

Cutting wheels 7 and 8 are each provided with bevels 14 and 15 on both sides, with bevels 14 facing away from ends 9 and 10 being of relatively short design, so that the individual user has an unobstructed view when positioning cutting edges 16 on the tile or glass.

To prevent the two cutting edges 16 of cutting wheels 7 and 8 making accidental contact with each other, elastic buffers 17 are located between operating handles 5.

Figure 4:
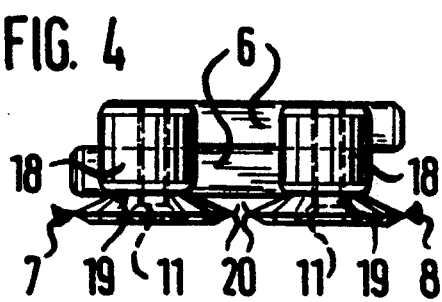
FIG. 4 View IV from FIG. 3.

In the practical example illustrated in FIGS. 3 and 4, the design of the lever mechanism is similar to that in the practical example illustrated in FIGS. 1 and 2. To facilitate description, the same item numbers have been used for identical parts.

The lever mechanism again comprises two, two-armed levers 2 and 3, which cross and are connected in a common axis of rotation 4.

While operating handles 5 are of the same design as in the practical example as per FIGS. 1 and 2, the pressure levers are of a slightly flatter design. Only at the ends do pressure levers 6 have thicker areas 18, where lateral flanks 19 lie in the same plane, at least on one side. Cutting wheels 7 and 8 are attached to these lateral flanks 19 of pressure levers 6 in such a way that their cutting edges 20 lie in a common plane. Their axes, which are again formed by screws 11, are exactly parallel to each other and parallel to axis of rotation 4 of the lever mechanism.

In all other respects, the design of cutting wheels 7 and 8 is identical to that in the practical example illustrated in FIGS. 1 and 2. However, their position on pressure levers 6 is offset through 90° in relation to the practical example illustrated in FIGS. 1 and 2.

Figure 5:
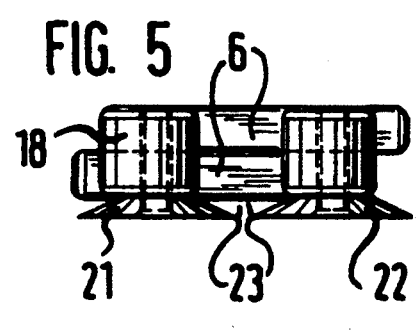
FIG. 5 Same view as in FIG. 4, with modified cutting wheels.

In the practical example illustrated in FIG. 5, cutting wheels 21 and 22 are slightly modified. The cross-section of cutting wheels 21 and 22 takes the form of a truncated cone, with the circumference of the larger base area forming the respective cutting edge 23. Cutting wheels 21 and 22 can be used both in the practical example illustrated in FIGS. 1 and 2, and in that illustrated in FIGS. 3 and 4. In both designs, cutting edge 23 is located on the side facing away from the relevant pressure lever 6, meaning that this practical example also allows a clear view when positioning the tool on the tile or the glass.

Figure 6:
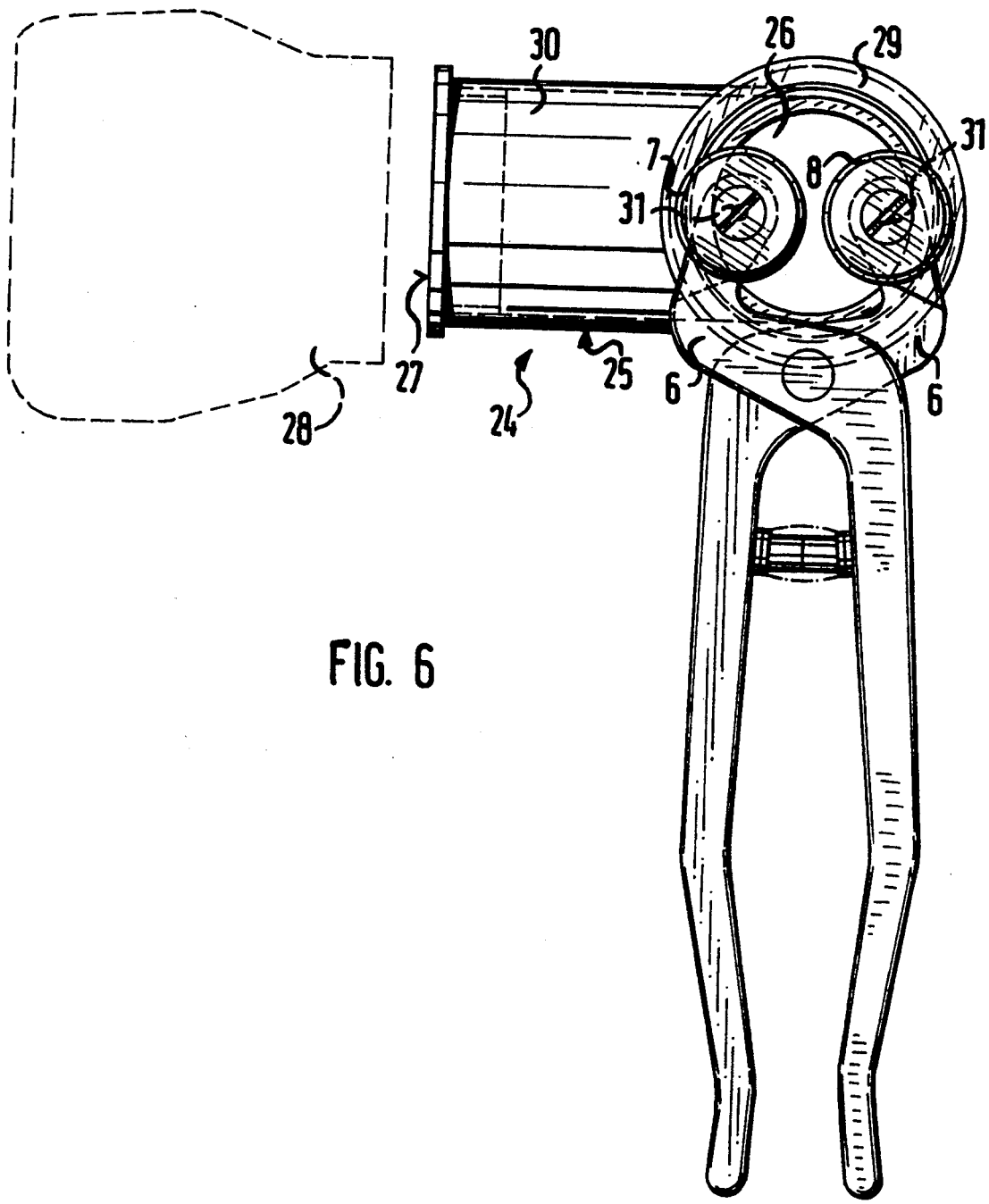
FIG. 6 View of a pair of cutting nippers as in FIG. 3, with a collector for splinters and chippings attached in addition.
Figure 7:
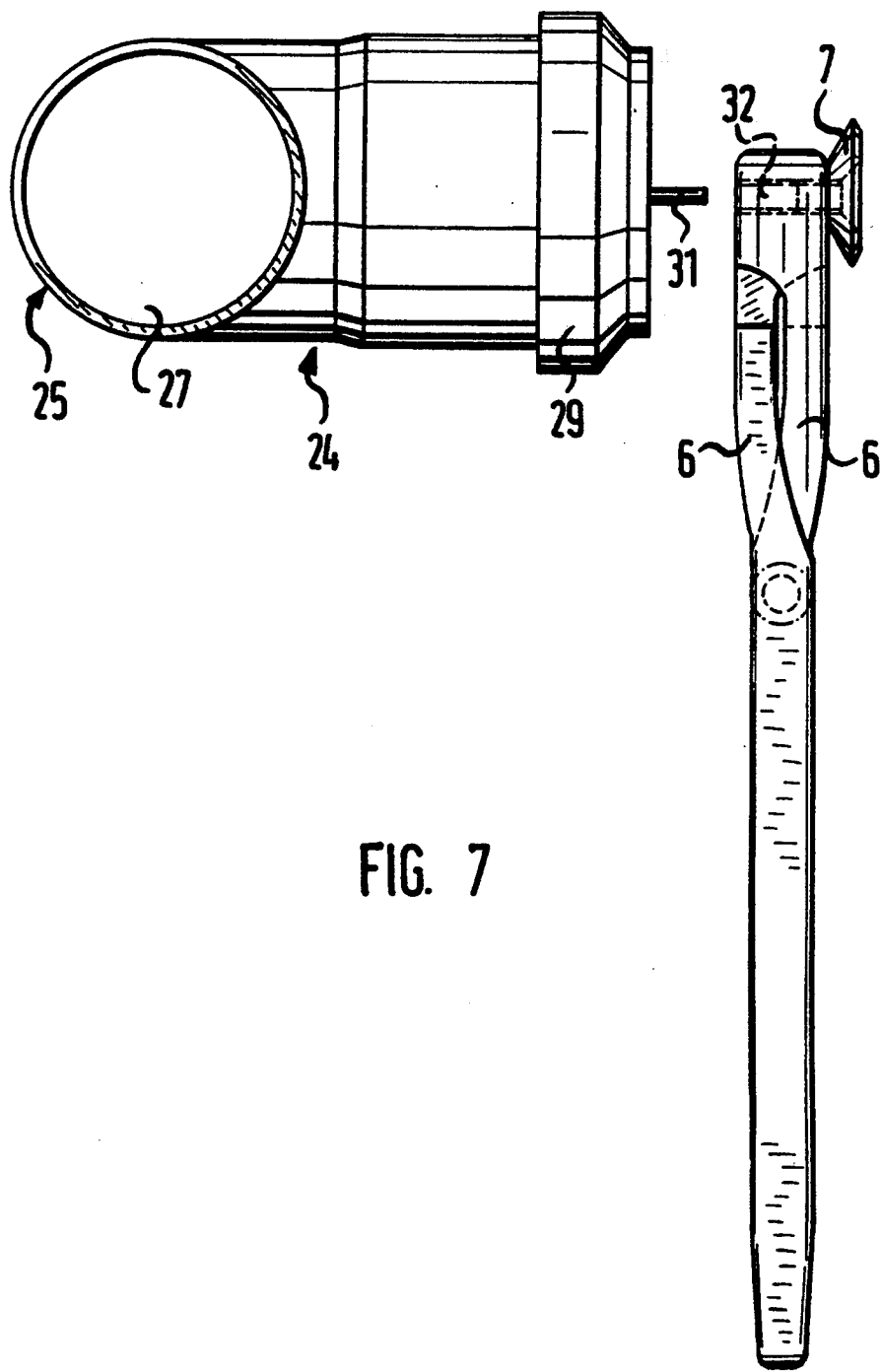
FIG. 7 Side view of the embodiment as per FIG. 6.

FIGS. 6 and 7 illustrate cutting nippers corresponding to the embodiment illustrated in FIG. 3. In this case, cutting wheels 7 and 8 are located on the lateral edges of pressure levers 6.

A collector 24 for loose splinters and chippings is secured behind cutting wheels 7 and 8. Collector 24 consists of a plastic elbow 25, with its inlet opening 26 located a short distance behind cutting wheels 7 and 8, and with a collecting bag 28 made of flexible material attached to its outlet opening 27, which is offset through 90° in relation to the inlet opening.

The mounting end of elbow 25 on the cutting nippers consists of collar 29, in which elbow 25 can be pivoted so that the elbow can be set in such a way that limb 30, on which collecting bag 28 sits, points downwards in any working position of the cutting nippers.

A wire clasp provided with resilient mounting ends, which is not illustrated in detail in the drawing, is located on collar 29. The mounting ends consist of axially projecting pins 31 which are engaged in holes drilled in pressure levers 6. In the practical example illustrated in the drawing, pins 31 are inserted into threaded holes 32 on the side of pressure levers 6 which faces away from cutting wheels 7 and 8, and screws 11 for securing cutting wheels 7 and 8 are screwed into these holes from the opposite side.

| List of reference numbers |
| --- |
| 1 Cutting nippers |
| 2 Two-armed lever |
| 3 Two-armed lever |
| 4 Axis of rotation |
| 5 Operating handle |
| 6 Pressure lever |
| 7 Cutting wheel |
| 8 Cutting wheel |
| 9 End |
| 10 End |
| 11 Screws |
| 12 Concentric holes |
| 13 Threaded holes |
| 14 Bevel |
| 15 Bevel |
| 16 Cutting edges |
| 17 Elastic buffers |
| 18 Thicker areas |
| 19 Lateral flank |
| 20 Cutting edges |
| 21 Cutting wheel |
| 22 Cutting wheel |
| 23 Cutting edges |
| 24 Collector |
| 25 Plastic elbow |
| 26 Inlet opening |
| 27 Outlet opening |
| 28 Collecting bag |
| 29 Collar |
| 30 Limb |
| 31 Pins |
| 32 Threaded holes |

I claim:

1. Cutting nippers comprising two long operating handles, two shorter pressure levers and detachable cutting wheels (7,8; 21, 22) located on working ends of the pressure levers, each cutting wheel having an axis of rotation, said cutting wheels being provided with cutting edges which are directed towards each other and can be moved towards and away from each other, and means (11, 13) for adjustably securing each cutting wheel (7, 8; 21, 22) in any autorotational position relative to its axis of rotation.

2. Cutting nippers as per claim 1, characterised in that the cutting wheels (7, 8; 21, 22) have a concentric drilled hole (12) and are screwed tight to the working ends of the pressure levers (6) with the aid of one screw (11) each.

3. Cutting nippers as per claim 1, characterised in that each cutting wheel (7, 8; 21, 22) has an all-round cutting edge (16; 20; 23) lying on the outer circumference of a circle.

4. Cutting nippers as per claim 3, characterised in that each cutting wheel (7, 8) has bevels (14, 15) sloping away from the all-round cutting edge (16; 20) on both sides.

5. Cutting nippers as per claim 4, characterised in that each cutting wheel (7, 8) has the form of a rotating member made up of two truncated cones, where the two base areas have the same diameter, are in contact with each other and form the cutting edge (16; 20).

6. Cutting nippers as per claim 3, characterised in that each cutting wheel (21, 22) has the form of a truncated cone, where the circumference of the larger base area forms the cutting edge (23).

7. Cutting nippers as per claim 1, characterised in that the cutting wheels (7, 8; 21, 22) are made of sintered metal carbide.

8. Cutting nippers as per claim 1, characterised in that, in each case, one operating handle and one pressure lever are made from a single piece and form a two-armed lever, with the two, two-armed. levers being connected via a common axis of rotation, in that the cutting wheels (7, 8; 21, 22) are located on the ends (9, 10) of the pressure levers (6) facing away from the axis of rotation (4) and in that the axes of the cutting wheels (7, 8; 21, 22) are roughly vertical to the ends (9, 10) of the pressure levers (6).

9. Cutting nippers as per claim 1, characterised in that, in each case, one operating handle and one pressure lever are made from a single piece and form a two-armed lever, with the two, two-armed levers being connected via a common axis of rotation, in that the cutting wheels(7, 8; 21, 22) are located on the lateral flanks (19) of the pressure levers (6), near to their ends facing away from the axis of rotation (4), with the cutting wheels (7, 8; 21, 22) lying roughly in a common plane and having axes which run roughly parallel to each other and parallel to the axis of rotation (4) of the levers.

10. Cutting nippers as per claim 8, characterised in that threaded holes (13) for optional attachment of a pair of cutting wheels are provided both in the ends (9, 10) of the pressure levers (6) facing away from the axis of rotation (4) and also vertical thereto in the lateral flanks (19) of the pressure levers (6).

11. Cutting nippers as per claim 8, characterised in that the cutting wheels (7, 8) have only a short bevel (14) on the side facing away from the relevant pressure lever (6).

12. Cutting nippers as per claim 6, characterised in that the larger base area of the cutting wheel (21, 22), which has the form of a truncated cone and forms the cutting edge (23), is located on the side facing away from the relevant pressure lever (6).

13. Cutting nippers as per claim 1, characterised in that a collector (24) for the loose splinters and chippings is provided behind the nipping tools.

14. Cutting nippers as per claim 9, characterised in that the collector (24) consists of a plastic elbow (25) with a collecting bag (28) made of flexible material secured to its side facing away from the cutting nippers.

15. Cutting nippers as per claim 14, characterised in that the mounting end of the elbow (25) is provided with a collar (29) in which the elbow (25) can be pivoted.

16. Cutting nippers as per one of the claim 13, characterised in that the receiving end of the collector (24) is provided with a wire clasp, the mounting ends of which can be secured to the pressure levers (6) of the cutting nippers.

17. Cutting nippers as per claim 16, characterised in that the mounting ends of the wire clasp are provided with axially projecting pins (31) which can be inserted into corresponding drilled holes (32) in the pressure levers (6).

* * * * *